Dec. 7, 1926.　　　　　L. J. G. BELLON　　　　　1,609,684

FISHING WINCH OR REEL FOR CASTING

Filed Nov. 26, 1923

Inventor
L. J. G. Bellon
By Marks & Clerk
Attys.

Patented Dec. 7, 1926.

1,609,684

UNITED STATES PATENT OFFICE.

LOUIS JOSEPH GEORGES BELLON, OF VINCENNES, FRANCE.

FISHING WINCH OR REEL FOR CASTING.

Application filed November 26, 1923, Serial No. 677,118, and in France November 12, 1923.

This invention relates to improvements in fishing reels for casting and more particularly to fishing reels, in which the drum which receives the line, is automatically braked in order to prevent back lash, that is to say, the winding of the line in reverse direction to the normal direction, when this drum attains an angular speed too high for the speed of unwinding of the line.

These improvements particularly relate to the mechanism which automatically effects the braking of the drum and are characterized by the interposition, between a rocking lever subjected to the pull of the line, and a member, the variable pressure contact of which with the drum, ensures the braking, of a system of jointed levers, so as to increase the senstiveness of the mechanism. This member or brake shoe has a semi-cylindrical surface and the shoe is eccentrically pivoted, so that it permits the rotation of the drum in one direction but brakes it in the opposite direction.

The accompanying drawing illustrates, by way of example only, a form of construction of an improved fishing reel in accordance with the invention.

In the drawing:—

Figure 1:
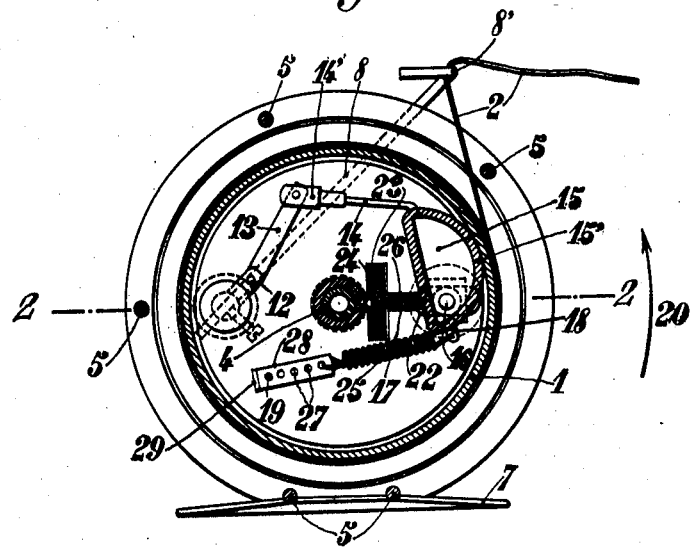
Fig. 1 is a vertical section on the line 1—1 of Fig. 2.
Figure 2:
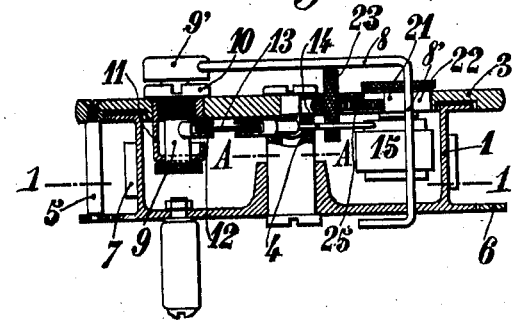
Fig. 2 is a horizontal section on the line 2—2 of Fig. 1.

The automatic braking mechanism is arranged within the drum 1 on which winds the line 2 and uses as a fixed support, the cheek 3 which carries the pivot 4 on which the drum rotates. This cheek 3 is rigidly connected to a ring 6 by cross-pieces 5, so arranged that two of them can be connected by soldering or other connecting means, to the base 7, which may be secured on the fishing rod (not shown). The line 2 when leaving the drum 1 passes over and contacts with the transverse arm 8' of a lever 8 mounted on the head 9' of a pivot 9 oscillatably mounted in a bearing 10 screwed on the cheek 3. This pivot 9 extends into an apertured housing 11 and is rigidly connected to an arm 12, joined by a link 13 to the end of a lever 14 rigid with the brake shoe 15. This brake shoe 15 has the shape of a sector and is mounted on an eccentric pivot 16 about which it can rock, when there is variation of equilibrium between the force exerted on the transverse arm 8' and the tension of a spring 17. This spring is stretched between a finger 18 rigid with the brake shoe 15, and a pin 19 secured on the cheek 3. This brake shoe 15 is coated on its curved surface, or at least on the portion of this surface capable of coming in contact with the inner face of the rim of the drum 1, with a sheet or layer 15' of rubber or other equivalent material capable of ensuring in the dry state a constant coefficient of friction on the metal constituting the drum.

In the absence of any external action on the lever 8, the spring 17 acts, bringing back the brake shoe 15 into contact with the drum 1 and ensuring the maximum braking action. It will be seen that owing to the special shape of the brake shoe 15 and to the fact that it is mounted on an eccentric pivot 16, the drum 1 can rotate in the direction of the arrow 20 (Fig. 1), but if the drum 1 is urged to turn in the opposite direction, the brake shoe 15 by wedging on the rim of the drum 1, prevents its rotation.

Rotation in a direction opposite to the arrow 20 will be permitted, for the winding or reeling up of the line, when the operator forces the lever 8 in reverse direction to the arrow 20. The brake shoe 15 thus plays the part both of an automatic brake and of a stop pawl.

The pivot 16 of the brake shoe 15 is rigid with a slide-block 21 suitably guided in an aperture 22 of the cheek 3. The slide block may be adjusted by rotating the milled nut 23 arranged in an opening 24 of the cheek 3 and threaded on the screw threaded rod 25 which is rigid with the slide-block 24 and arranged in the slot 26. The length of the lever 14 may be adjusted by screwing or unscrewing its head 14' relatively to its rod and, finally, the initial tension of the spring 17 may be modified at will, by inserting the pin 19 in one or the other of the holes 27, formed in the plate 28 which is provided with a finger engaging member 29.

I am aware that various changes may be made in the details disclosed without departing from the spirit of the invention as expressed in the claim.

What I claim as my invention and desire to secure by Letters-Patent is:—

A fishing reel including a stationary cheek member, a line-receiving drum rotatably mounted on the cheek member, a guide in the cheek member, a sliding block in said guide movable toward and away from the axis of the drum, manually operated means for moving the block in the guide, a pivot pin carried by said block, a brake shoe mounted on the pivot pin, arranged within the drum and adapted to contact with the inner surface of the latter for preventing the rotation of the drum in one direction, a spring within the drum engaging the brake shoe for swinging it on its pivot in a direction toward the periphery of the drum, a rock shaft mounted in the cheek member, links pivotally connecting the rock shaft to the shoe to permit the shoe to be swung toward the axis of the drum when the rock shaft is turned in one direction, and an arm fixed to the rock shaft exteriorly of the drum and provided with a finger extending across the reel and adapted to engage the fishing line.

In testimony whereof I have signed my name to this specification.

LOUIS JOSEPH GEORGES BELLON.